United States Patent
Heo et al.

(10) Patent No.: US 7,110,449 B2
(45) Date of Patent: Sep. 19, 2006

(54) DECISION FEEDBACK EQUALIZER

(75) Inventors: Seo Weon Heo, Seoul (KR); Ivonete Markman, Carmel, IN (US); Jeongsoon Park, West Lafayette, IN (US); Saul Brian Gelfand, Lafayette, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 78 days.

(21) Appl. No.: 10/511,493

(22) PCT Filed: Apr. 9, 2003

(86) PCT No.: PCT/US03/10889

§ 371 (c)(1),
(2), (4) Date: Oct. 15, 2004

(87) PCT Pub. No.: WO03/090348

PCT Pub. Date: Oct. 30, 2003

(65) Prior Publication Data

US 2005/0243908 A1    Nov. 3, 2005

Related U.S. Application Data

(60) Provisional application No. 60/372,970, filed on Apr. 6, 2002.

(51) Int. Cl.
*H03H 7/30* (2006.01)

(52) U.S. Cl. .................................. 375/233; 375/350
(58) Field of Classification Search ............. 375/232, 375/233, 350; 708/323
See application file for complete search history.

(56) References Cited

U.S. PATENT DOCUMENTS

| | | | |
|---|---|---|---|
| 5,063,573 A | 11/1991 | Langewellpott | |
| 6,240,133 B1 | 5/2001 | Sommer et al. | |
| 6,529,559 B1 | 3/2003 | Reshef | |
| 6,724,809 B1 * | 4/2004 | Reznik | 375/148 |
| 2004/0008765 A1 * | 1/2004 | Chung et al. | 375/233 |

OTHER PUBLICATIONS

Copy of Search Report Dated Jun. 14, 2003.

* cited by examiner

*Primary Examiner*—Don N. Vo
(74) *Attorney, Agent, or Firm*—Joseph J. Laks; Ronald H. Kurdyla; Joseph J. Opalach

(57) ABSTRACT

A decision feedback equalizer for processing a data signal provides concurrent equalizer outputs for hard decision directed and soft decision directed modes. The joint architecture in accordance with the present invention takes advantage of the fact, herein recognized, that for each equalizer output symbol soft decision bit representation, a subset of these bits corresponds to the hard decision representation. As a result, the invention permits the concurrent output of two distinct modes with essentially the same hardware as a one output equalizer.

28 Claims, 2 Drawing Sheets

DECISION FEEDBACK EQUALIZER

CROSS-REFERENCE TO RELATED APPLICATIONS

This application claims the benefit, under 35 U.S.C. § 365 of International Application PCT/US03/10889, filed Apr. 9, 2003, which was published in accordance with PCT Article 21(2) on Oct. 30, 2003 in English and which claims the benefit of U.S. Provisional patent application No. 60/372,970, filed Apr. 6, 2002.

BACKGROUND OF THE INVENTION

The present invention relates generally to equalizers and, more particularly, to adaptive equalizers such as may be used to compensate for signal transmission by way of a channel having unknown and/or time-varying characteristics.

In the Advanced Television Systems Committee (ATSC) standard for High Definition Television (HDTV) in the United States, the equalizer is an adaptive filter which receives a data stream transmitted by vestigial sideband modulation (VSB), VSB being the modulation system in accordance with the ATSC-HDTV standard, at an average rate equal to the symbol rate of approximately 10.76 MHz. The equalizer attempts to remove or reduce linear distortions mainly caused by multipath propagation, which are a typical characteristic of the terrestrial broadcast channel. See United States Advanced Television Systems Committee, "ATSC Digital Television Standard," Sep. 16, 1995.

Decision Feedback Equalizers (DFE's) as used in the communications art generally include a feedforward filter (FFF) and a feedback filter (FBF), wherein typically the FBF is driven by decisions on the output of the signal detector, and the filter coefficients can be adjusted to adapt to the desired characteristics to reduce the undesired distortion effects. Adaptation may typically take place by transmission of a "training sequence" during a synchronization interval in the signal or it may be by a "blind algorithm" using property restoral techniques of the transmitted signal. Typically, the equalizer has a certain number of taps in each of its filters, depending on such factors as the multipath delay spread to be equalized, and where the tap spacings "T" are generally, but not always, at the symbol rate. An important parameter of such filters is the convergence rate, which may be defined as the number of iterations required for convergence to an optimum setting of the equalizer. For a more detailed analysis and discussion of such equalizers, algorithms used, and their application to communications work, reference is made to the technical literature and to text-books such as, for example, "Digital Communications", by John G. Proakis, $2^{nd}$ edition, McGraw-Hill, New York, 1989; "Wireless Communications" by Theodore S. Rappaport, Prentice Hall PTR, Saddle River, N.J., 1996; and "Principles of Data Transmission" by A. P. Clark, $2^{nd}$ edition, John Wiley & Sons, New York, 1983.

BRIEF SUMMARY OF THE INVENTION

In accordance with an aspect of the invention, a decision feedback equalizer for processing a data signal provides concurrent equalizer outputs for hard decision directed and soft decision directed modes. The joint architecture in accordance with the present invention takes advantage of the fact, herein recognized, that for each equalizer output symbol soft decision bit representation, a subset of these bits corresponds to the hard decision representation. As a result, the invention permits the concurrent output of two distinct modes with essentially the same hardware as a one output equalizer.

In accordance with another aspect of the invention, a decision feedback equalizer (DFE) for processing a data signal exhibits concurrent soft and hard decision directed (dd) operating modes for providing respective soft dd and hard dd equalizer outputs, wherein each equalizer output symbol soft decision bit representation concurrently includes both hard and soft decision representations.

In accordance with another aspect of the invention, a decision feedback equalizer (DFE) for processing a data signal and providing DFE output signals, comprises a feedforward filter (FFF); a feedback filter (FBF); a slicer, the slicer, the FFF and the FBF being mutually coupled for forming a decision feedback equalizer configuration, the equalizer configuration exhibiting concurrent hard and soft decision directed (dd) operating modes. DFE output bit representations corresponding to both the hard and soft dd operating modes are outputted concurrently.

In accordance with another aspect of the invention, a method for decision feedback equalization for deriving more than one output data signal from a data input signal to be processed, the method comprises the steps of: applying the data input signal to be processed to a feedforward filter (FFF); coupling a feedback filter (FBF) and a slicer to the FFF for forming therewith a decision feedback equalizer (DFE) configuration exhibiting concurrent hard and soft decision directed (dd) operating modes and outputs; and coupling an input of the FBF to an output of the slicer in the hard dd operating mode and coupling a further input of the FBF to one of the DFE output signals in the soft dd operating mode such that the bit representation for each output symbol in the DFE output includes as a subset thereof a bit representation of the output of the slicer.

BRIEF DESCRIPTION OF THE SEVERAL VIEWS OF THE DRAWINGS

The invention will be more fully understood from the detailed description which follows, in conjunction with the drawing in which.

DETAILED DESCRIPTION OF THE INVENTION

Figure 1:
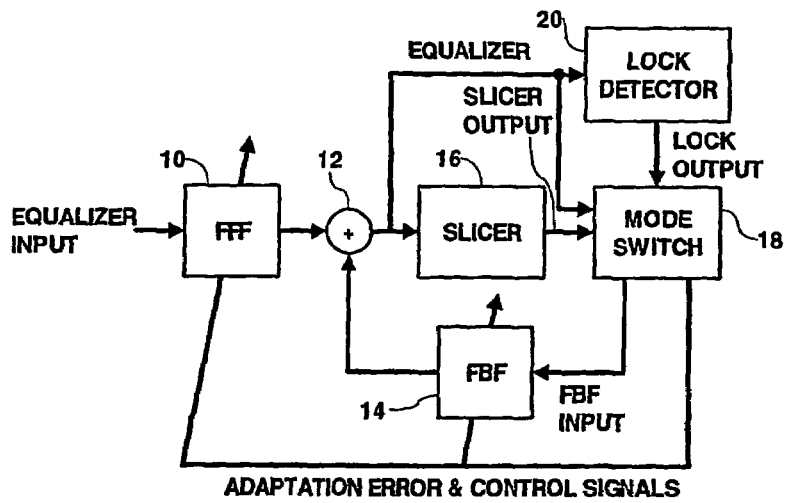
FIG. 1 shows a schematic block diagram of a decision feedback equalizer (DFE) architecture.

An equalizer in accordance with the present invention comprises a T-spaced (where T is the symbol period) DFE (Decision Feedback) equalizer with three available modes: training, blind and decision directed (dd). Before entering into a detailed description of preferred embodiments of the present invention, it will be helpful to a better understanding of the principles of the present invention and to defining certain terns to consider first a somewhat simplified block diagram of a Decision Feedback Equalizer (DFE) architecture as shown in FIG. 1.

The input to the DFE is coupled to a Feed-Forward Filter (FFF) 10 whose output is coupled to a summation unit 12, the other input to summation unit 12 being coupled to the output of a Feed-Back Filter (FBF) 14. The output of summation unit 12 is coupled to a slicer 16, to an input of a mode switch 18, and to a lock detector 20. The output of lock detector 20 is coupled to a control input of mode switch 18. The output of slicer 16 is coupled to another input of mode switch 18 and an output of mode switch 18 is coupled to an input of FBF 14. Another output of mode switch 18 is coupled to coefficient control inputs of FFF 10 and FBF 14.

The functions of the FFF 10, FBF 14 and slicer 16 are well known and constitute the basic functions of filtering and quantization, respectively. See, for example, the afore-cited text by Proakis. Additional information on filters and their implementation can be found in various textbooks such as, for example, "Digital Signal Processing," by John G. Proakis and Dimitris G. Manolakis, Prentice Hall, N.J.; 1996 and "Introduction to Digital Signal Processing," by Roman Kuc, McGraw-Hill Book Company, New York; 1988. Lock detector 20 is responsible for the equalizer lock detector function. It updates the lock detector output by comparing the equalizer output against the slicer levels with a threshold. If the equalizer output and slicer levels are within the threshold distance, a lock is detected. Mode switch 18 selects the input to the FBF filter as well as the error and control signals to be used in the equalizer adaptation, according to the equalizer mode of choice. It also checks the lock detector output. In normal operation, mode switch 18 has an automatic switching capability, which depends on the output of equalizer lock detector 20. Mode switch 18 interprets the training and blind modes as being used for convergence purposes only. After the equalizer lock detector detects convergence, the equalizer is then transitioned to the decision directed (dd) mode. If convergence is lost, the equalizer goes back to training or blind mode.

In the Advanced Television Systems Committee (ATSC) standard, a training sequence was included in the field sync to allow for initial equalizer convergence. In training mode, the equalizer coefficients are only updated during the field sync. However, two main drawbacks associated with its use are that it requires prior correct detection of the field sync and that the training sequence is contained in the field sync, which only occurs approximately every 25 milliseconds (ms), possibly resulting in slow convergence.

For ghost environments that make it difficult to detect a field sync or with a dynamic component, it is of interest to have an initial adjustment of the equalizer tap coefficients independent of a training sequence, that is, self-recovering or blind. See, for example the above cited text by Proakis and the paper by D. N. Godard, "Self-Recovering Equalization and Carrier Tracking in Two Dimensional Data Communication Systems" IEEE Trans. on Commun., Vol. COM-28, pp. 1867–1875, November 1980.

Furthermore, because it works on every data symbol, the blind algorithm will have a faster convergence.

As is typically the case in the conventional dd mode, the input to FBF 14 is the output of slicer 16. Thus, in the dd mode, the adaptation error and the input to the feedback filter are aided by the presence of a slicer, and coefficient adaptation takes place throughout the data sequence. This mode does not have good convergence capabilities, but after convergence, it has advantages over the other two modes. The advantage of dd mode with respect to blind mode is attributable to the presence of the slicer, resulting in better MSE (mean squared error) and BER (bit error rate) performance at the equalizer output. With respect to the training mode, the fact that dd updates its tap on every symbol, as opposed to training symbols only, allows for faster adaptation and tracking capabilities.

It is herein recognized that the use of blind and dd modes as an aid or alternative approaches to training mode are desirable because, inter alia, the training mode in the ATSC-HDTV standard has a slow convergence, as well as poor dynamic tracking capabilities.

For many years, DFE has been a controversial subject in the area of communications receiver design. While DFE has the potential for equalizing a highly dispersive linear channel at a low complexity cost, it may suffer from error propagation, a mechanism whereby incorrect source symbol estimates can cause future decision errors leading to possibly long error bursts. See, for example, the papers by P. Monsen, "Theoretical and Measured Performance of a DFE Modem on a Fading Multipath Channel", IEEE Trans. on Commun, Vol. COM-25(10), pp. 1144.1153,. October 1977; and by S. A. Altekar and N. C. Beaulieu, "Upper Bounds to the Error Probability of Decision Feedback Equalization", IEEE Trans. on Info. Theory, Vol. IT-39(1), pp. 145–156, January 1993; and the afore-cited text by A. P. Clark on page 221.

In accordance with a principle of the present invention, simulation of an ATSC receiver including a DFE equalizer for the HDTV terrestrial channel with strong multipath and Additive White Gaussian Noise (AWGN) showed that the receiver performance can be improved if the decision directed mode is replaced by a soft decision directed mode, whereby the input to the FBF filter is the equalizer output, instead of the slicer output. As is known in the communications art, a demodulator, including a quantizer, may operate in a "hard" or "soft" mode. Very briefly stated, in the hard mode, the decision as to whether a 1 or a zero was transmitted is based on the polarity of the demodulator output and is irrevocable, whereas in the soft mode, signal amplitude is also utilized to an extent so as to improve the performance in making this determination. Information on hard- and soft-decision demodulators may be found in the technical literature such as, for example, "Telecommunications Transmission Handbook," $4^{th}$ Edition, by Roger L. Freeman, John Wiley & Sons, Inc., New York, 1998: pp. 340 et seq. The significance of these modes in the context of the present invention will become apparent from the description which follows.

As will hereinafter be described and explained in greater detail by way of illustrative embodiments, the present invention comprises a Decision Feedback Equalizer (DFE) architecture which permits concurrent equalizer outputs for two separate modes: (hard) decision directed (dd) and soft decision directed. The difference between the hard and soft dd modes is associated with the input to the equalizer feedback filter being the output of the slicer (hard decision) or equalizer output (soft decision). The joint architecture takes advantage of the fact, herein recognized, that for each equalizer output symbol soft decision bit representation, a subset of these bits corresponds to the hard decision representation. As a result, this architecture in accordance with the present invention permits the concurrent output of two distinct modes with basically the same hardware as the one output equalizer.

In the ATSC-HDTV receiver, when the terrestrial channel presents multipath transmission and white noise, particularly a combination of strong multipath and low signal-to-noise ratio (SNR), error propagation in the feedback filter of the equalizer affects the performance at the output of the Viterbi decoder in such a way that the automatic switching equalizer mode (blind/dd) presents worse performance than blind only mode or a mode that we call soft automatic switching equalizer mode. In automatic switching mode, the equalizer is in blind mode prior to convergence (lock) and switches to (hard) dd mode after convergence (lock) is detected. If convergence is lost, it switches back to blind mode. Soft automatic switching mode is similar to automatic switching mode, except that the dd mode is a soft dd mode. In soft dd mode, the input to the feedback filter is the output of the equalizer, instead of the slicer output. The Viterbi decoder is a known type of convolutional decoder using a path maximum-likelihood decoding algorithm. A detailed description of the Viterbi decoder may be found in the technical literature such as, for example, the afore-mentioned "Telecommunications Transmission Handbook," $4^{th}$ Edition, by Roger L. Freeman, John Wiley & Sons, Inc., New York, 1998: pp. 348–354.

By designing an equalizer architecture which provides concurrent outputs for the two separate modes of hard and soft dd, the receiver can take advantage of it and process these outputs to decide on which mode is the most appropriate performance wise.

Figure 2:
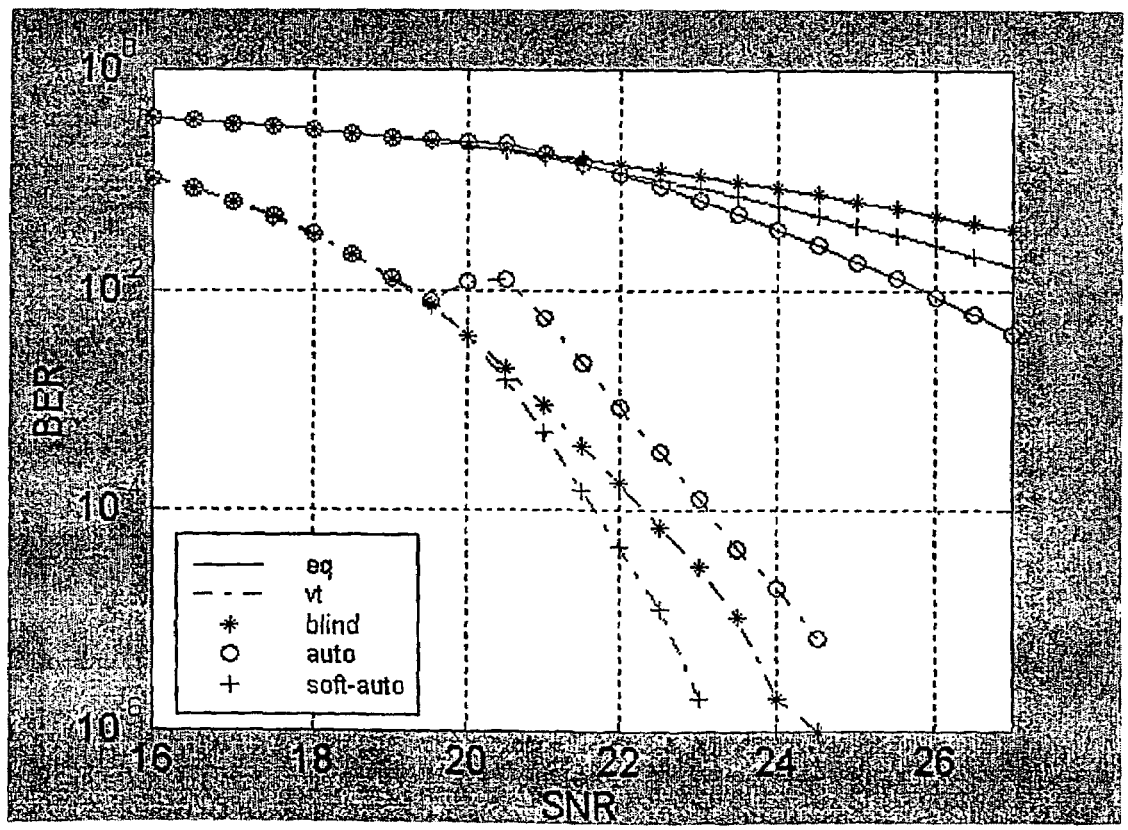
FIG. 2 shows bit error rate (BER) versus signal to noise ratio in dB for an equalizer and Viterbi decoder under a 3 dB, 0.3 microsecond (µs) ghost signal and additive white Gaussian noise (AWGN)

FIG. 2 shows BER vs. SNR performance curves of the HDTV receiver in the AWGN plus multipath channel. The multipath channel for this example is one 3 dB, 3 µs ghost, which is a relatively strong ghost. The performance is measured after the equalizer as well as after the Viterbi decoder (VD).

Curves shown in FIG. 2 are illustrative of results in accordance with principles of the present invention. Three curves are shown for the equalizer as well as VD output: one for the equalizer in blind mode, another for automatic switching mode and the third one for soft automatic switching mode. It is herein recognized from the information indicated by FIG. 2 that the following conclusions may be arrived at:

(a) The equalizer output performance is equal or better under automatic switching mode than in blind only or soft automatic switching mode. For increasing SNR, the automatic switching performance is increasingly better.

(b) However, the VD output performance does not reflect the equalizer output performance, especially for medium SNR. For those values of SNR, the VD output performance is worse under automatic switching mode than in blind only or soft automatic switching mode by up to □1.5 dB.

(c) Additional simulations also show that this problem becomes more evident for strong ghosts, although still present in a smaller scale for weaker ghosts.

It is herein recognized that it is therefore desirable to detect these conditions of error propagation for which the standard dd mode delivers a worse overall performance than the soft dd mode, and switch the modes. It is particularly of interest to compare the performance of both modes.

Another important conclusion resulting from the simulation work is that there is no substantial difference in the equalizer tap convergence between the automatic switching mode (blind plus dd) and the soft automatic switching mode (blind plus soft dd), since the convergence is mostly done by the blind mode. Accordingly, the main factor in the performance difference between the hard and soft automatic switching modes corresponds to the FBF filter data: whether slicer output or equalizer output.

Recognizing the foregoing advantages, it is an object of the present invention to concurrently run both the hard and soft automatic switching modes in the equalizer such that the equalizer concurrently delivers its outputs for both modes. As a result, it permits the receiver to process these outputs on real time and make the appropriate choice, with hardly any increase in equalizer complexity.

Accordingly, there follows a detailed description of an exemplary embodiment in accordance with the principles of the present invention incorporating the design of a Decision Feedback Equalizer (DFE) architecture which permits concurrent equalizer outputs for two separate modes: (hard) decision directed (dd) and soft decision directed. The difference between the hard and soft dd modes is associated with the input to the equalizer feedback filter being the output of the slicer (hard decision) or equalizer output (soft decision). The joint architecture takes advantage of the fact that, for each equalizer output symbol, a subset of its bit representation corresponds to the hard decision representation associated with the slicer output. As a result, this proposed architecture permits the concurrent output of two distinct modes with basically the same hardware as a one output equalizer.

Figure 3:
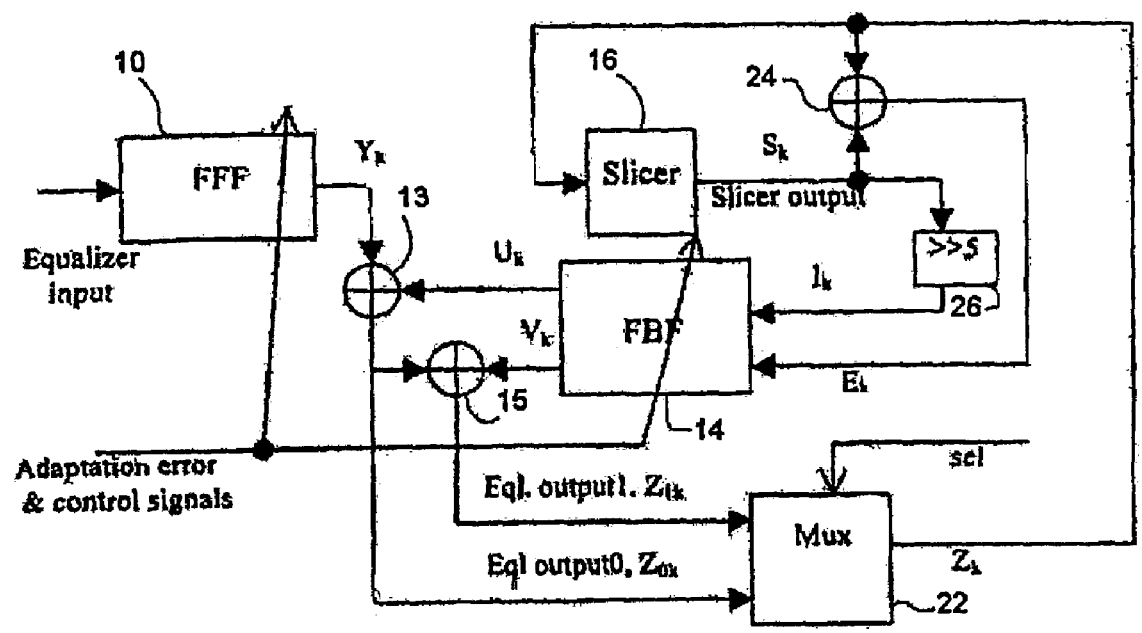
FIG. 3 shows a schematic block diagram of a joint soft/hard decision feedback equalizer (DFE) architecture in accordance with the present invention.

FIG. 3 shows a block diagram of the joint dd system architecture. For this architecture, the lock detector and mode switch can be implemented as described for the traditional DFE architecture described above in conjunction with the apparatus shown in FIG. 1. Thus, FIG. 3 need only address the FFF, FBF and Slicer blocks. In FIG. 3 the input to the DFE in accordance with the present invention is coupled to a signal input of a Feed-Forward Filter (FFF) 10 whose output is coupled to a first input of a first summation unit 13, the second input of summation unit 13 being coupled to a first output of a Feed-Back Filter (FBF) 14. The output of summation unit 13 is coupled to a first input of a multiplexer (MUX) 22 and to the first input of a second summation unit 15. A second input of summation unit 15 is coupled to a second output of FBF 14, and the output of summation unit 15 is coupled to a second input of MUX 22. The output of MUX 22 is coupled to a subtracting signal input of a third summation unit 24 and to the input of a slicer 16. The output of slicer 16 is coupled to another input of summation unit 24 and to a first input of FBF 14 by way of a division unit 26. The output of summation unit 24 is coupled to a second signal input of FBF 14.

Adaptation error and control signals are applied to control inputs of FFF 10 and FBF 14, analogously to the architecture of FIG. 1, signals being derived from a mode switch.

In the present exemplary architecture, the mode switch (not shown in FIG. 3) can be connected in a number of different ways. A simple way is to utilize the slicer output and $Z_k$ as inputs, as well as the lock output (lock detector not shown in FIG. 3). The outputs of mode switch are then $I_k$ and $E_k$ for both blind and decision directed modes, as well as adaptation error and control signals as in FIG. 1. $I_k$ is associated with the hard decision directed mode only, and $I_k$ and $E_k$ with the soft decision directed (dd) and blind modes.

The mode switch has an adaptation error signal, which is $E_k$ under the decision directed mode and is a different function under blind mode, as will be further explained below. The lock detector can monitor $Z_{1k}$ and $Z_{0k}$ at the same time or it could just monitor $Z_k$. The lock detector output selects the dd or blind modes. The system starts in blind mode and once lock is detected, it transitions to decision directed mode. As will be understood, there are various alternative ways of carrying out these connections for arriving at the appropriate functions.

With regard to FBF 14 in FIG. 3, the filter memory or register, which contains the data, can be thought of as two separate sets of memory $I_k$ and $E_k$, but in practice, they can be grouped together, where each register has "$I_k E_k$" in this order, for example. The filter coefficients $C_k$ are one only adaptive set. However, they separately multiply $I_k$ and $E_k$ to create equations (2) below. The whole operation can also be thought of as one filter with 2 signal outputs. Both operations in equations (2) below go to the output in soft decision directed mode and in blind mode. However, only equation (2a) is needed for hard decision directed mode.

In operation, for the system shown in FIG. 3, the following relation applies:

$$Z_k = S_k - E_k \quad (1)$$

where $Z_k$ is the slicer input, $S_k$ is the slicer output and $E_k$ is the slicer error.

As an example, for a data representation of 10 bits, the values of $Z_{0k}$, $Z_{1k}$ and $Z_k$ require 10 bits. The slicer levels may be chosen to be □32, □96, □160 and □224. It is noted that the values of $S_k$ need only be stored with a 4-bit representation. Division unit, in the present exemplary embodiment utilizes a 5-bit right-shift operation, which corresponds to a division by 32. Therefore $I_k$ assumes the value of □1, □3, □□ or □7. In addition, $E_k$ is bounded by (−288, 287) in the worst-case condition, requiring 9 bits.

The FBF filtering operation is explained by the following equations:

$$(a) U_k = (C_k^T * \bar{I}_k) << 5$$

$$(b) V_k = C_k^T * \bar{E}_k \quad (2)$$

where $C_k$ is the equalizer FBF tap coefficient vector at time k, $(.)^T$ is the transpose operation, and $\bar{I}_k$ and $\bar{E}_k$ are the corresponding vectors of $I_k$ and $E_k$ variables.

Hence, the equalizer outputs for both (hard) dd as well as soft dd modes are respectively:

$$(a) Z_{0k} = U_k + Y_k$$

$$(b) Z_{1k} = U_k + Y_k + V_k = Z_{0k} + V_k \quad (3)$$

where $U_k$ and $V_k$ satisfy equations (2), and $Y_k$ is the output of the FFF filter block. Observe that under blind mode, the equalizer output also satisfies the equation (3b) since the input to the FBF filter under blind mode is the equalizer output, and not the slicer output. The proper equalizer output for each mode can then be fed to subsequent stages of the receiver for further processing. In the case of the dd mode, both hard and soft outputs can be concurrently fed to subsequent stages of the receiver for further processing.

MUX unit 22 takes a sel input signal from the mode switch and chooses whether $Z_{0k}$ or $Z_{1k}$ is sent to the slicer. This is used to differentiate blind mode from dd mode. The sel signal can be the usual lock detector output. If the lock detector output is 0, there is no lock, therefore the mode is blind, and $Z_k = Z_{1k}$. If the lock detector output is 1, then the equalizer is locked, the mode is dd, and $Z_k = Z_{0k}$. As shown in Equations (3), for soft dd mode the equalizer output is $Z_{1k}$. Additional information in the form of a control bit would be needed in the sel signal to make the distinction between hard or soft dd. This could be information fed back to the equalizer as to which dd mode results in best performance for a particular channel. However, as will be explained below, in accordance with the principles of the present invention, it is chosen to establish the MUX unit 22 output (and input to the slicer) for both dd modes as $Z_k = Z_{0k}$, which results in simplified hardware and no major difference in performance.

The blind mode filtering and adaptation satisfies the previous architecture described in conjunction with the system shown in FIG. 1. For this mode, the error adaptation $Er_k$ is calculated according to Godard's algorithm and is not $E_k$. See the above-referenced paper by Godard. Accordingly, in FIG. 3, the adaptation error and control signal inputs are shown separately, and they are fed by the equalizer mode switch unit as in FIG. 1. The adaptation error $Er_k$ is equal to $E_k$ when under dd mode only.

As for the equalizer tap coefficient adaptation, this operation in the FBF is described by $$C_{k+1} = C_k + \mu * Er_k * (\bar{I}_k << 5) \quad (4)$$

for both dd modes, with the sel input in the mux unit being equal to 1. For blind mode, it is $$C_{k+1} = C_k + \mu * Er_k * ((\bar{I}_k << 5) + E_k) = C_k + \mu * Er_k * Z_k \quad (5)$$

with the sel input in the mux unit being equal to 0.

The equalizer tap coefficient adaptation in the FFF is described by $$C_{k+1} = C_k + \mu * Er_k * \bar{X}_k \quad (6)$$

for all the modes, where Ck is the equalizer FFF tap coefficient vector at time k and $\bar{X}_k$ is the FFF memory content vector at instant k.

As will be understood, Equation (4) does not correspond to the theoretical formula of the adaptation for a soft dd case, which would be equation (5) since the input to the FBF filter is the equalizer output. However, in order to perform both equations concurrently for both dd modes one would need to basically double the FBF size. Fortunately, simulations have shown that there is no major difference in performance in soft dd mode when equations (4) are applied instead of (5). This has to do with the fact that convergence is performed with the equalizer in blind mode, and only tracking is accomplished by the dd mode.

Table 1 below summarizes the architecture of FIG. 3 for the different equalizer modes.

TABLE 1

| Eql. Mode | Sel | Eql. Output | Tap Adaptation |
|---|---|---|---|
| Blind | 0 | eq. (3b) | eq. (5) |
| Dd | 1 | eq. (3a) | eq. (4) |
| soft dd | 1 | eq. (3b) | eq. (4) |

In summary, there has been disclosed a Decision Feedback Equalizer (DFE) architecture which permits concurrent equalizer outputs for two separate modes: (hard) decision directed (dd) and soft decision directed. The difference between the hard and soft dd modes is associated with the input to the equalizer feedback filter being the output of the slicer (hard decision) or equalizer output (soft decision). The joint architecture takes advantage of the fact that, for each equalizer output symbol soft decision bit representation, a subset of these bits corresponds to the hard decision representation. As a result, this architecture in accordance with the present invention permits the concurrent output of two distinct modes with basically the same hardware as the one output equalizer.

While the present invention has been described by way of exemplary embodiments, it will be recognized and understood by one of skill in the art to which the invention pertains that various changes and substitutions may be made without departing from the invention as defined by the claims following. Thus, for example, while the equalizer architecture in accordance with the invention has been described by way of embodiments suitable for an HDTV-ATSC equalizer, the invention can be applied to any general use equalizer with a DFE architecture. Furthermore, the invention can be suitably implemented for use in any digital receiver, such as a television or data receiver, which includes a DFE equalizer. In addition, although described in the context of a symbol-spaced (T-spaced, where T is the symbol period) equalizer, the invention can also be applied to fractionally-spaced equalizers, where T is smaller than the symbol period. Fractionally spaced equalizers are described in several textbooks, such as in the afore-mentioned "Digital Communications", by John G. Proakis, $2^{nd}$ edition, McGraw-Hill, New York, 1989. Also, the soft decision directed input to the FBF, although described as the equalizer output, could also be a more complex soft decision function of the equalizer output. It should also be understood that the equalizer in FIG. 3 could also include the training mode as well. The training mode of operation would be exclusive with respect to the blind mode as in a traditional DFE and would not interfere with the decision directed modes.

What is claimed is:

1. A decision feedback equalizer (DFE) for processing a data signal and providing DFE output signals, said DFE comprising:
    a feedforward filter (FFF) (10);
    a feedback filter (FBF) (14);
    a slicer (16), said slicer (16), said FFF (10) and said FBF (14) being mutually coupled for forming a decision feedback equalizer configuration, said equalizer configuration exhibiting concurrent hard and soft decision directed (dd) operating modes; and
    wherein the DFE output bit representations corresponding to both said hard and soft dd operating modes are outputted concurrently; and including
    a controllable multiplexer (MUX) (22) coupled to said equalizer configuration for coupling a selected one of said outputs of said DFE to the input of said slicer (16), according to the value of a selector input to said MUX (22).

2. A decision feedback equalizer (DFE) as recited in claim 1, wherein the bit representation for each output symbol in said DFE outputs includes as a subset thereof a bit representation of said output of said slicer.

3. A decision feedback equalizer (DFE) as recited in claim 2, wherein said bit representation for each output symbol in said DFE outputs is associated with the FBF (14) input in said soft dd mode and wherein said bit representation of said output of said slicer (16) is associated with the FBF (14) input in said hard dd mode.

4. A decision feedback equalizer as recited in claim 1, including a lock detector (20) coupled to said DFE concurrent outputs for providing a lock signal indicative of an equalizer convergence condition according to an equalizer convergence detection algorithm.

5. A decision feedback equalizer as recited in claim 4, wherein said equalizer configuration exhibits a selectable blind mode of operation, and
    said equalizer including a mode switch (18) responsive to said lock signal and being coupled to said lock detector output, MUX output, and to said slicer (16) for providing respective control signals for controlling the operating mode characteristics of said FFF (10) and said FBF (14) and for selecting said operating modes responsive to said lock signal.

6. A decision feedback equalizer as recited in claim 5, wherein said mode switch (18) comprises a lock detector (20) and provides control signals to said FFF (10) and said FBF (14) for causing selection from among said dd and said blind modes of operation based upon lock characteristics of said DFE output signal.

7. A decision feedback equalizer as recited in claim 1, wherein said equalizer configuration exhibits a selectable blind mode of operation.

8. A decision feedback equalizer (DFE) for processing a data signal and providing DFE output signals in accordance with any of a hard decision directed (dd) mode, a soft dd mode, and a blind mode, said DFE comprising:
    a feedforward filter (FFF) (10) having a control input, having an adaptation error input, having an input for receiving said data signal, and having an output;
    a feedback filter (FBF) (14) having a control input, having an adaptation error input, having first and second data inputs, and having first and second outputs;
    a multiplexer (MUX) (22) having control input, having first and second inputs, and having an output;
    a first summing unit (13) having a first input coupled to said output of said FFF (10), having a second input coupled to said first output of said FBF (14), and having an output coupled to said first input of said MUX (22);
    a second summing unit (15) having a first input coupled to said output of said first summing unit (13), having a second input coupled to said second output of said FBF (14), and having an output coupled to said second input of said MUX (22);
    a slicer (16) having an input coupled to said output of said MUX (22) and having an output;
    a lock detector (20) for monitoring an equalizer convergence condition and providing a lock signal indicative of a locked condition; a mode switch (18) having a control input coupled to said output of said lock detector, a first input coupled to said MUX (22) output, a second input coupled to said slicer (16) output, and two outputs coupled to the FBF (14) inputs;
    said mode switch (18) coupling the said slicer (16) output to said first input to said FBF (14); and
    said mode switch (18) further comprising a third summing unit (24) having a first input coupled to said output of said slicer (16), having a second input coupled to said output of said MUX (22), and having an output coupled to said second input of said FBF (14).

9. A decision feedback equalizer (DFE) as recited in claim 8, wherein said output of said slicer (16) is coupled to said first input of said FBF (14) by way of a dividing unit (26).

10. A decision feedback equalizer (DFE) as recited in claim 9, wherein said dividing unit (26) divides by a predetermined number.

11. A decision feedback equalizer (DFE) as recited in claim 10, wherein said dividing unit (26) divides by 32.

12. A decision feedback equalizer (DFE) as recited in claim 11, wherein said dividing unit (26) divides by 32 by performing a 5-bit right-shift operation.

13. A decision feedback equalizer (DFE) as recited in claim 8, wherein said input of said lock detector (20) is coupled to at least one of said first and second outputs of said DFE.

14. A decision feedback equalizer (DFE) as recited in claim 11, wherein said mode switch (18) control input is coupled to said lock detector (20) output, at least one of said inputs of said MUX (22) and said output of said slicer (16).

15. A decision feedback equalizer (DFE) as recited in claim 14, wherein said mode switch (18) selects one or other of said hard decision directed (dd) mode, said soft dd mode, and said blind mode, depending upon said lock signal and signal characteristics.

16. A decision feedback equalizer (DFE) as recited in claim 8, wherein the bit representation for each output symbol in said DFE outputs includes as a subset thereof a bit representation of said output of said slicer.

17. A decision feedback equalizer as recited in claim 8, wherein said bit representation for each output symbol in said DFE outputs is associated with the FBF (14) input in said soft dd mode and wherein said bit representation of said output of said slicer is associated with the FBF (14) input in said hard dd mode.

18. A decision feedback equalizer (DFE) as recited in claim 8, wherein the DFE outputs satisfy the following equations:

$$Z_{0k}=U_k+Y_k$$

$$Z_{1k}=U_k+Y_k+V_k=Z_{0k}+V_k$$

where $Z_{0k}$ is the output in hard dd mode, $Z_{1k}$ is the output in soft dd and blind mode, $Y_k$ is the output of the FFF (10) filter block and $U_k$ and $V_k$ satisfy the following equations:

$$U_k=(C_k^T*\bar{I}_k)<<5$$

$$V_k=C_k^T*\bar{E}_k$$

where $C_k$ is the equalizer FBF (14) tap coefficient vector at time k, $(.)^T$ is the transpose operation, $\bar{I}_k$ and $\bar{E}_k$ are the corresponding vectors of the $I_k$ and $E_k$ variables, $I_k$ is the first FBF (14) input and $E_k$ is the second FBF (14) input.

19. A decision feedback equalizer (DFE) as recited in claim 18, wherein the equalizer FBF (14) tap adaptation in decision directed mode may satisfy one of the following equations:

$$C_{k+1}=C_k+\mu*Er_k*(\bar{I}_k<<5) \text{ or}$$

$$C_{k+1}=C_k+\mu*Er_k*((\bar{I}_k<<5)+\bar{E}_k)=C_k+\mu*Er_k*Z_k$$

where $C_{k+1}$ is the equalizer FBF (14) tap coefficient vector at time k+1, $C_k$ is the equalizer tap coefficient vector at time k, $\mu$ is the adaptation step size, <<5 means a left shift of 5 bits, or multiplication by 32, Zk is the MUX (22) output, Ĩk and Ẽk are the corresponding vectors of the Ik and Ek variables, Ik is the first FBF (14) input, Ek is the second FBF (14) input and Erk is the mode tap adaptation error; and wherein the equalizer FBF tap adaptation in blind mode satisfies the second equation above.

20. A decision feedback equalizer (DFE) as recited in claim 18, wherein the MUX (22) selector output $Z_k$ may be chosen to be one of $Z_{0k}$ and $Z_{1k}$ when in both hard and soft dd modes and is $Z_{1k}$ when in blind mode.

21. A decision feedback equalizer (DFE) for processing a data signal and providing DFE output signals, said DFE comprising:
 means (10) for feedforward filtering of said data signal;
 means (14) for feedback filtering;
 means (16) for signal slicing; and
 means for coupling said means (10) for feedforward filtering, said means (14) for feedback filtering, and said means (16) for signal slicing for forming a DFE configuration exhibiting concurrent hard and soft decision directed (dd) operating modes and outputs; and
 means for coupling an input of said means for feedback filtering FBF (14) to an output of said means (16) for signal slicing in said hard dd operating mode and coupling a further input of said means for feedback filtering to one of said DFE output signals in said soft dd operating mode such that the bit representation for each output symbol in said DFE output includes as a subset thereof a bit representation of said output of said slicer; and including
 means (22) for multiplexing signals between said means (10) for feedforward filtering, said means (14) for feedback filtering, and said means for signal slicing (16), so as to cause said DFE configuration to operate in a blind operating mode.

22. A decision feedback equalizer as recited in claim 21, including means (22) for multiplexing signals between said means (10) for feedforward filtering, said means (14) for feedback filtering, and said slicer means (16) for signal slicing, so as to cause said DFE configuration to operate in a selected one of said operating modes.

23. A decision feedback equalizer as recited in claim 21, including means (20) for monitoring the convergence state of said DFE configuration.

24. A decision feedback equalizer as recited in claim 23 including means (22) for multiplexing signals between said means (10) for feedforward filtering, said means (14) for feedback filtering, and said slicer means (16) for signal slicing so as to cause said DFE configuration to operate in a selected one of said operating modes in accordance with said state of convergence.

25. A method for decision feedback equalization for deriving more than one output data signal from a data input signal to be processed, said method comprising the steps of:
 applying said data input signal to be processed to a feedforward filter (FFF) (10);
 coupling a feedback filter (FBF) (14) and a slicer (16) to said FFF (10) for forming therewith a decision feedback equalizer (DFE) configuration exhibiting concurrent hard and soft decision directed (dd) operating modes and outputs; and
 coupling an input of said FBF (14) to an output of said slicer (16) in said hard dd operating mode and coupling a further input of said FBF (14) to one of said DFE output signals in said soft dd operating mode such that the bit representation for each output symbol in said DFE output includes as a subset thereof a bit representation of said output of said slicer (16); and including
 multiplexing signals between said FFF (10), said FBF (14), and said slicer (16) so as to cause said DFE configuration to operate in a blind operating mode.

26. A method for decision feedback equalization as recited in claim 25 including the step of multiplexing signals between said FFF (10), said FBF (14), and said slicer (16) so as to cause said DFE configuration to operate in a selected one of said operating modes.

27. A method for decision feedback equalization as recited in claim 25 including the step of monitoring the convergence state of said DFE configuration.

28. A method for decision feedback equalization as recited in claim 27, including the step of multiplexing signals between said FFF (10), said FBF (14), and said slicer (16) so as to cause said DFE configuration to operate in a selected one of said operating modes in accordance with said state of convergence.

* * * * *